US006738903B1

(12) United States Patent  (10) Patent No.: US 6,738,903 B1
Haines  (45) Date of Patent: May 18, 2004

(54) PASSWORD PROTECTED MEMORY ON REPLACEABLE COMPONENTS FOR PRINTING DEVICES

(75) Inventor: Robert E. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/480,537

(22) Filed: Jan. 10, 2000

Related U.S. Application Data

(63) Continuation-in-part of application No. 09/410,989, filed on Oct. 1, 1999, now Pat. No. 6,494,562.

(51) Int. Cl.$^7$ .............................. H04L 9/00; G03G 15/00
(52) U.S. Cl. ........................... 713/168; 399/12; 380/22; 380/30; 705/75
(58) Field of Search ................................. 713/168, 171, 713/179, 155, 193, 190, 202; 340/572.8; 235/382; 399/12, 24, 77; 380/22, 26, 30, 51; 705/75

(56) References Cited

U.S. PATENT DOCUMENTS

| | | | |
|---|---|---|---|
| 4,670,857 A | 6/1987 | Rackman | 705/51 |
| 5,132,729 A | 7/1992 | Matsushita et al. | 399/24 |
| 5,579,088 A | 11/1996 | Ko | 399/12 |
| 5,629,981 A * | 5/1997 | Nerlikar | 713/168 |
| 5,688,056 A | 11/1997 | Peyret | 400/61 |
| 6,201,474 B1 * | 3/2001 | Brady et al. | 340/572.8 |
| 6,609,656 B1 * | 8/2003 | Elledge | 235/382 |

FOREIGN PATENT DOCUMENTS

| | | |
|---|---|---|
| EP | 0542462 A2 | 11/1992 |
| EP | 0996041 A2 | 4/2000 |

\* cited by examiner

Primary Examiner—Emmanuel L. Moise

(57) ABSTRACT

A printing device component having a memory tag with password protected data areas to control read and write access to the memory tag. The memory tag provides an encrypted authorization code to a printing device into which the component is installed. The printing device determines if the authorization code is valid and, if so, the printing device enables all printing device functions. Otherwise, limited functions are enabled. The memory tag utilizes encryption methods to allow only authorized user access to read from and write to selected data areas of the memory tag.

21 Claims, 4 Drawing Sheets

AUTHENTICATION OF INTERROGATOR TO CARTRIDGE

PASSWORD PROTECTED MEMORY ON REPLACEABLE COMPONENTS FOR PRINTING DEVICES

CROSS REFERENCE TO RELATED APPLICATIONS

This application is a continuation in part of U.S. application Ser. No. 09/410,989 filed Oct. 1, 1999 now U.S. Pat. No. 6,494,562.

TECHNICAL FIELD

This invention generally relates to replaceable components installable into printing devices, and more particularly, to printing device components having a memory.

BACKGROUND

Several types of printing devices, such as printers, copiers, facsimile machines, etc., have replaceable components installed in them that have a life cycle during which the component is functional. When the functional life cycle ends, the component is replaced with a new component. Examples of replaceable components for printing devices include ink cartridges, toner cartridges, ribbon cartridges, fusers, photoconductors, drums, and the like.

After a replaceable component has reached the end of its functional life cycle, it can be recycled. For instance, when a toner supply within the toner cartridge has been depleted, it can be refurbished by the original manufacturer or by another toner cartridge vendor. Refurbishing a toner cartridge includes, among other things, replenishing the toner supply. Preferably, the toner cartridge is refilled with toner that conforms to the manufacturer's original specifications so that the printing device will print properly and the refurbished toner cartridge will have an acceptable life cycle. After a toner cartridge has been refurbished, it can be resold for further use in a printing device.

Original equipment manufacturers (OEM) rely on trademarks and trade dress to uniquely identify their products to consumers as being manufactured or refurbished to original product specifications. A consumer is thereby assured that he is purchasing a reliable component specifically manufactured or refurbished for his printing device. By purchasing OEM components for a printing device, the consumer is guaranteed that the component will conform to manufacturer specifications, function as expected within the printing device, and protect the printing device from sustaining damage.

Counterfeit refurbished printer cartridges pose a significant problem for legitimate OEMs. For example, consider a laser printer that is manufactured and sold by Hewlett-Packard. The laser printer originally contains a toner cartridge that is manufactured by Hewlett-Packard or a certified OEM. When the toner cartridge is depleted, the owner of the printer may choose to purchase a toner cartridge from a company other than Hewlett-Packard and send in the original cartridge to be refurbished. The vendor who receives the old toner cartridge is now in possession of a toner cartridge that has been manufactured by Hewlett-Packard and possesses all the outer markings of a genuine Hewlett-Packard toner cartridge.

Hewlett-Packard does not exercise any control over the actions of the vendor, who is free to refill the cartridge with any type of toner. The vendor may refill the cartridge with a less expensive, inferior toner and resell the cartridge as a genuine Hewlett-Packard toner cartridge. Also, the vendor may not completely refill the toner cartridge with toner, giving the consumer much less than the consumer has bargained for. To further enhance such a fraudulent scheme, some counterfeit cartridge vendors have been known to actually duplicate the packaging of the original manufacturer. The consumer—who believes he has purchased a quality toner cartridge—actually receives an inferior product that may not produce the print quality or print as many pages as a genuine cartridge.

In addition, using inferior toner in a toner cartridge may also cause damage to a consumer's printer. Not only does the consumer sustain damage directly to his printer, the manufacturer of the printer may be harmed if the consumer attempts to have the printer repaired under the manufacturer's warranty on the printer.

Some printer cartridges are manufactured with memory integrated as part of the cartridge itself or placed on the cartridge as part of the labeling. This memory is used to store printer related data that the printer reads to determine certain printing parameters and communicate information to the user. For example, the memory may store the model number of the cartridge so that the printer may recognize the cartridge as one which is compatible with that particular printer. Additionally, by way of example, the cartridge memory may store the number of pages that can be expected to be printed from the cartridge during a life cycle, thereby allowing the printer to determine how many additional pages may be printed by the cartridge.

This advancement in technology has not proven to stop counterfeit cartridge vendors from trading on a manufacturer's earned reputation. Information that would be stored in cartridge memory by a manufacturer is simply stored by the vendor. For example, if the manufacturer places a code in the cartridge memory to indicate that it has been refurbished by the manufacturer, a counterfeit cartridge vendor can simply read the code from an authentic cartridge and write the same code to each cartridge the vendor refurbishes.

Utilizing read-only memory on printer cartridges is not a practical solution to the problem because there are various types of vendors who legitimately require write access to such memory. For example, a reseller may need to access the memory to store a telephone number or a Universal Resource Locator (URL) that would be provided to the consumer to assist in ordering a replacement cartridge. Additionally, the printing device itself may perform functions that require the device to write to the memory.

SUMMARY

The present invention contemplates encrypting data stored in memory on a replaceable component of a printing device to prevent unauthorized access to the memory. This will deter counterfeit cartridge vendors from having the ability to read data from an authentic cartridge that could thereafter be stored in the memory of a counterfeit cartridge. At the same time, authorized vendors may have access to read the data.

A printer cartridge having memory containing an encrypted authorization code provides the authorization code to a printer into which the cartridge is installed. The printer is provided with a decryption key to decrypt the authorization code. If the authorization code is valid, the printer enables all its functions and operates normally. If the authorization code is invalid, the printer enables only its basic print functions. Certain functions that depend on the quality of the printer cartridge are disabled. For example, a printer may have a function that tracks the number of pages printed from a printer cartridge and estimates the number of pages that may be printed from the toner remaining in the cartridge. Upon detection of an invalid authentication code, the printer would disable this function as being unreliable since the function would require the printer to know certain information about the cartridge and the toner—e.g., how much toner was originally in the cartridge, how much toner is used per page, etc. Because a counterfeit cartridge vendor may use an inferior type of toner or only partially fill the cartridge with toner, it would be impossible for the printer to have the information required for the function to operate reliably.

The present invention also provides for password protection of portions of cartridge memory, or data areas, so that only authorized entities having an encryption key provided by the manufacturer can obtain read or write access to certain portions of the memory. One or more data areas may be configured so that any device may read from or write to the data areas. Other data areas may be configured to allow all devices to read the data contained therein but would require a device to present a password before being allowed to write to the data areas. Still other data areas may be configured to require a device to have a password or key before being allowed to read from or write to the data areas.

In the example of the reseller who needs write access to the memory to store a URL for ordering a new cartridge, that reseller provides encrypted data to the memory. Logic associated with the memory determines which area of memory the reseller may access to store the information. The resellers password allows access only to that specific area of the memory. The reseller would not have the ability to read from or write to other areas of the memory to which the reseller does not require access.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
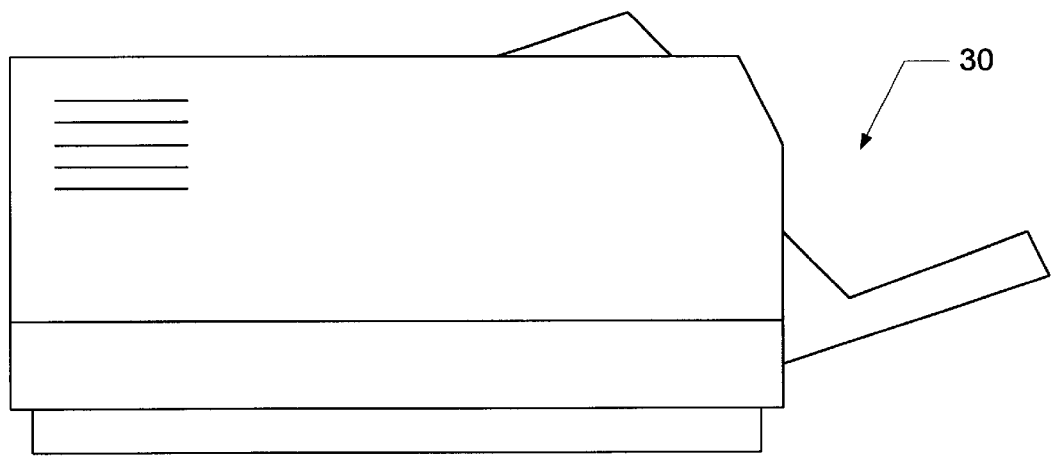
FIG. 1 is a diagrammatic illustration of a laser printer.

FIG. 1 is a diagrammatic illustration of a laser printer 30 in which the present invention may be implemented. The invention may further be implemented in other units that employ printing devices, such as scanners, photocopiers, facsimile machines, and the like. For purposes of discussion, the invention is described in the context of laser printers.

Figure 2:
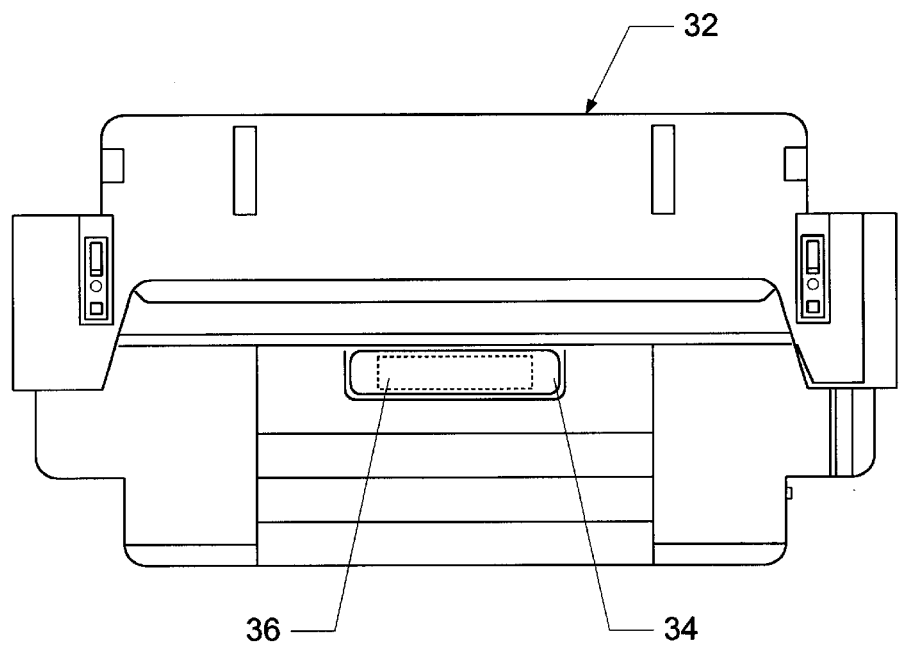
FIG. 2 is a diagrammatic illustration of a laser printer toner cartridge.

FIG. 2 shows a toner cartridge 32 which is installable in the laser printer 30. The toner cartridge 32 has a label 34 which contains information identifying the toner cartridge 32 to a user. The label 34 typically recites the name of the manufacturer, the model number of the cartridge, etc. Although the invention is shown and described herein embodied as a printer toner cartridge for a laser printer, it is noted that the invention may be embodied as any replaceable component (toner cartridge, ink cartridge, fuser, drum, etc.) installable in a printing device (printer, copier, fax machine, etc.).

A memory tag 36 is located underneath the label 34 on the toner cartridge 32, although it is understood that the memory tag 36 may be placed on the toner cartridge 32 at any location which may be practical for the purposes described herein. The memory tag 34 is preferably a radio frequency identification (RFID) memory tag. RFID memory tags and applications therefor are well known in the art. Further aspects of the RFID memory tag 36 structure and its functionality in the present invention will become more clear as the discussion progresses.

Figure 3:
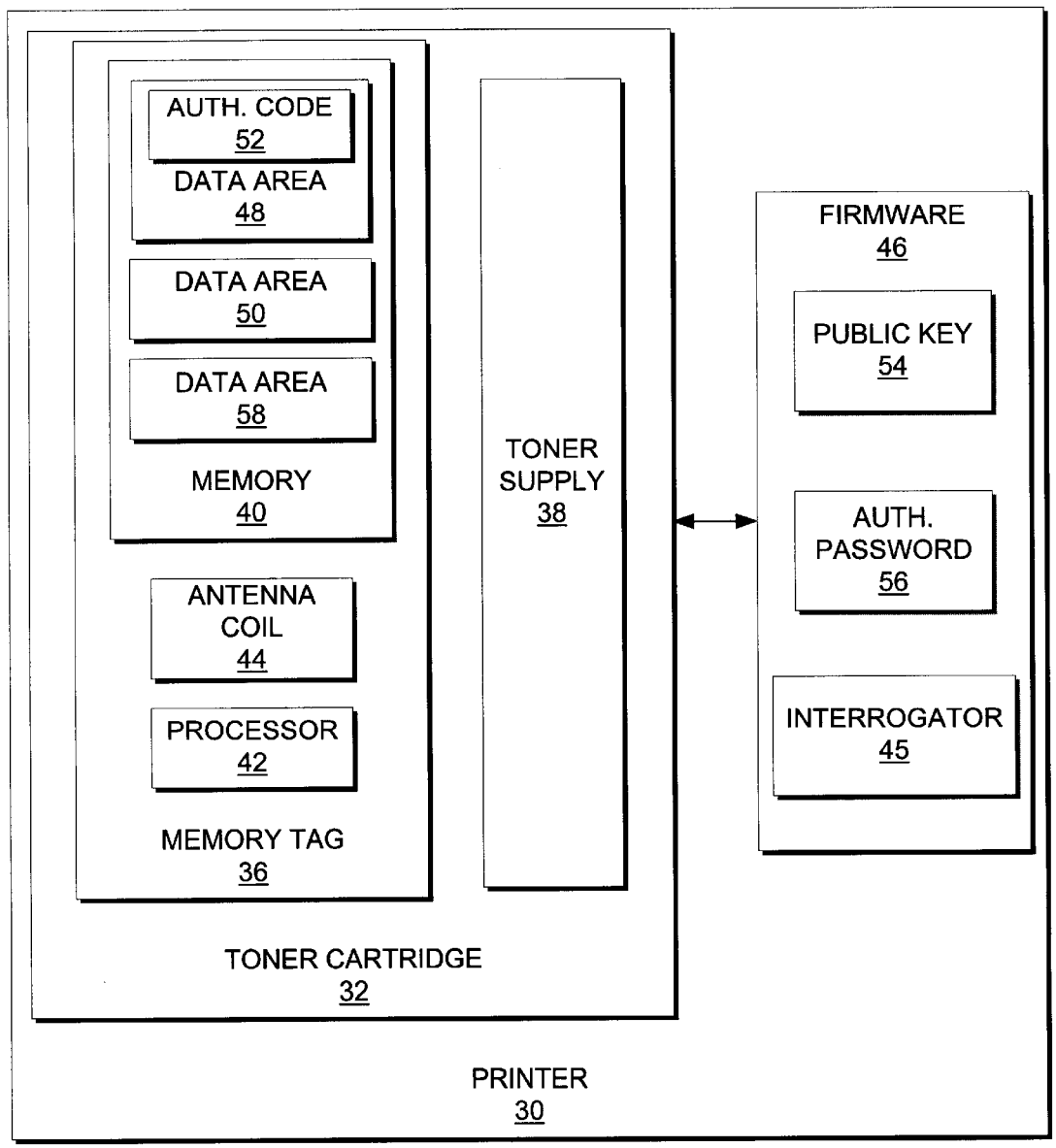
FIG. 3 is a block diagram of a printer.

FIG. 3 is a block diagram of printer 30 constructed in accordance with the present invention. The printer 30 has the toner cartridge 32 installed therein which may be removed and replaced by another toner cartridge (not shown). The toner cartridge 32 includes a memory tag 36 and a toner supply 38.

As previously stated, the memory tag 36 is an RFID memory tag, although it is noted that the memory tag 36 may be conventional semiconductor memory. If, however, the memory tag 36 is semiconductor memory, some of the features described herein will not function unless a logic unit is provided to operate in conjunction with the semiconductor memory.

The RFID memory tag 36 has memory 40, a processor 42, and an antenna coil 44. The RFID memory tag 36 is designed to operate in conjunction with an interrogating device, also known as an interrogator. An interrogator is a device that reads from or writes to the memory tag 36. Examples of interrogators include a printer, a memory tag reader or scanner, a memory tag writing device which stores data on the memory tag 36, and the like. In the present example, the laser printer 30 includes an interrogator 45.

The interrogating device emits a radio frequency field which provides power to the memory tag 36 via the antenna coil 44. The memory tag 36, therefore, does not require its own power supply, a feature which adds to the cost efficiency and practicality of utilizing RFID memory for the memory tag 36.

Communications between an interrogator and an RFID memory tag are transmitted and received via the radio frequency field and the antenna coil 44 utilizing standard RFID method and protocol, as promulgated in ISO 14443 and ISO 15693. Therefore, physical contact between the memory tag 36 and the printer 30 is not required for the printer 30 to communicate with the memory tag 36.

RFID memory is particularly suited for the present application because it does not require physical contact between the memory tag 36 and the interrogating device. Additionally, RFID memory can be read from or written to through many layers of packaging—up to several centimeters thick, a feature that is particularly useful in the manufacture and marketing of toner cartridges.

The manufacturer may store certain data in the memory tag 36 when a toner cartridge is manufactured. After the toner cartridges are manufactured, they are packaged and marketed to resellers who distribute the toner cartridges to retailers or to end users.

A reseller may wish to write information specific to the reseller to the memory tag. For example, the reseller could store a URL in the memory tag so that the end user will have convenient access to the reseller's ordering system when the end user needs to order a new toner cartridge 32. If the toner cartridge 32 is equipped with RFID memory, the reseller can store the URL in the memory tag 36 directly through the toner cartridge packaging without having to establish physical contact with the memory tag 36.

Utilization of RFID memory is also advantageous for worldwide marketing of toner cartridges. A toner cartridge manufacturer may store certain information in the memory tag 36, but may leave areas of the memory tag 36 available for later use by resellers. The toner cartridge 36 may be shipped to another country which communicates in a language other than English. Language-specific information, such as information that will be displayed to a user, can be written to the memory tag 36 in the appropriate language. The manufacturer is thus relieved of the burden of manufacturing special toner cartridges for specific countries. Instead, the manufacturer can make a generic toner cartridge and allow resellers to provide the more specific information to the memory tag 36.

The toner cartridge 32 communicates with the printer 30 via firmware 46 resident within the printer 30. The firmware 46 is software which controls printer functions and provides communication between the printer 30 and its components, and between the printer 30 and the system (not shown) within which the printer 30 operates.

The memory 40 has a data area 48 which contains encrypted data and a data area 50 which contains unencrypted data. Data area 48 contains an encrypted authorization code 52 which is utilized to authenticate the toner cartridge 32 to the printer 30.

Figure 4:
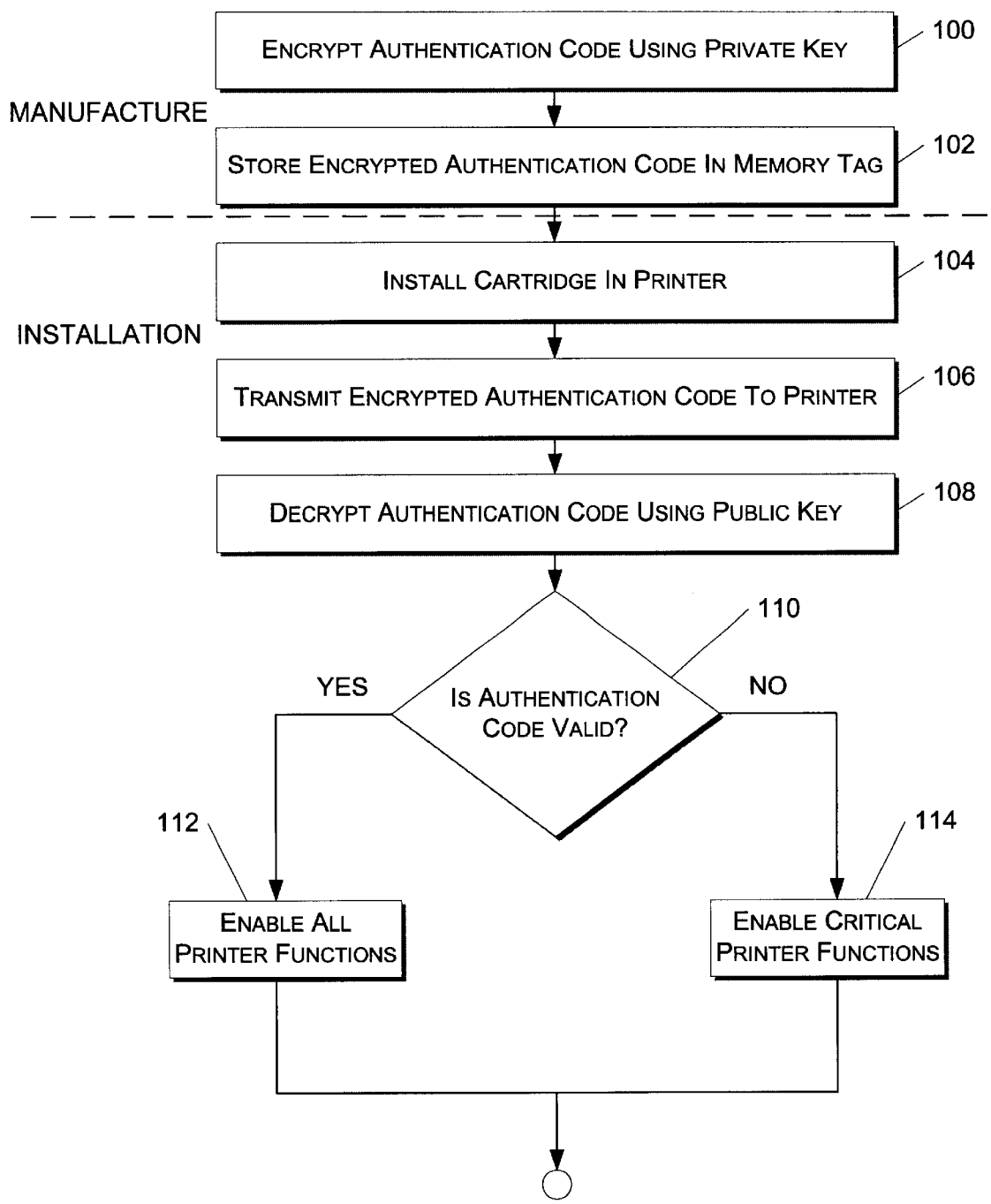
FIG. 4 is a flow diagram of a cartridge to printer authentication process.

FIG. 4 depicts the process of authenticating the toner cartridge 32 to the printer 30. The process has two phases: a manufacturing phase and an installation phase. At the time of manufacture, the toner cartridge manufacturer encrypts the authentication code 52 using a private key, i.e., an encryption code known only to the manufacturer (Step 100). For instance, a manufacturer may encrypt the authentication code 52 using the well-known RSA algorithm which employs a pair of public and private keys. Items encrypted with the private key can be decrypted with the public key and vice versa. At Step 102, the encrypted authentication code 52 is stored in data area 48 of the memory 40.

During the installation phase, the toner cartridge 32 is installed in the printer 30 at Step 104 of FIG. 4. At this time, the authentication code 52 is transmitted to the printer 30 from the memory tag 36 (Step 106). The firmware 42 in the printer 30 decrypts the authentication code 52 using a public key 54 which is provided by the printer manufacturer and is stored in the firmware 46. The public key 54 corresponds to the private key used by the manufacturer to encrypt the authentication code 52. The result is compared to an authentication password 56 stored in the firmware 46 to determine the validity of the authentication code 52, as shown in Step 110 of FIG. 4.

If the authentication code 52 is valid (i.e., the "yes" branch from Step 110), all the functions of the printer 30 are enabled (Step 112). If the authentication code 52 is invalid (i.e., the "no" branch from Step 110), only critical functions of the printer 30 are enabled (Step 114). The term critical functions is determined by the printer manufacturer and can mean only those functions necessary for the printer 30 to provide basic printing functions, or it can mean any function that is not dependent on reliable information from the toner cartridge 32. For example, the remaining page count function discussed previously is not a critical function because the printer 30 may operate without this function and because this function must receive reliable information from the toner cartridge to provide accurate results.

Data area 50, which stores unencrypted data, can be read by any device that can access the memory tag 36. Data area 50 may be write-protected so no device can overwrite the contents stored therein, or it may be unprotected so that a reseller may use data area 50 for purposes specific to the reseller, such as to store a reseller's URL and make it available to a user.

Referring to FIG. 3, the memory 40 has an additional data area 58, which contains data that may be encrypted or unencrypted. If the data contained in data area 58 is unencrypted, then the data is readable by the public without the use of a decryption key. If the data contained in data area 58 is encrypted, then an entity desiring to read the data contained therein would first be required to decrypt the data using a public decryption key made available by the manufacturer.

It is noted that regardless of how a data area is configured for read access, any data area may be configured so that only certain interrogators—such as authorized resellers—can write to that particular data area.

Figure 5:
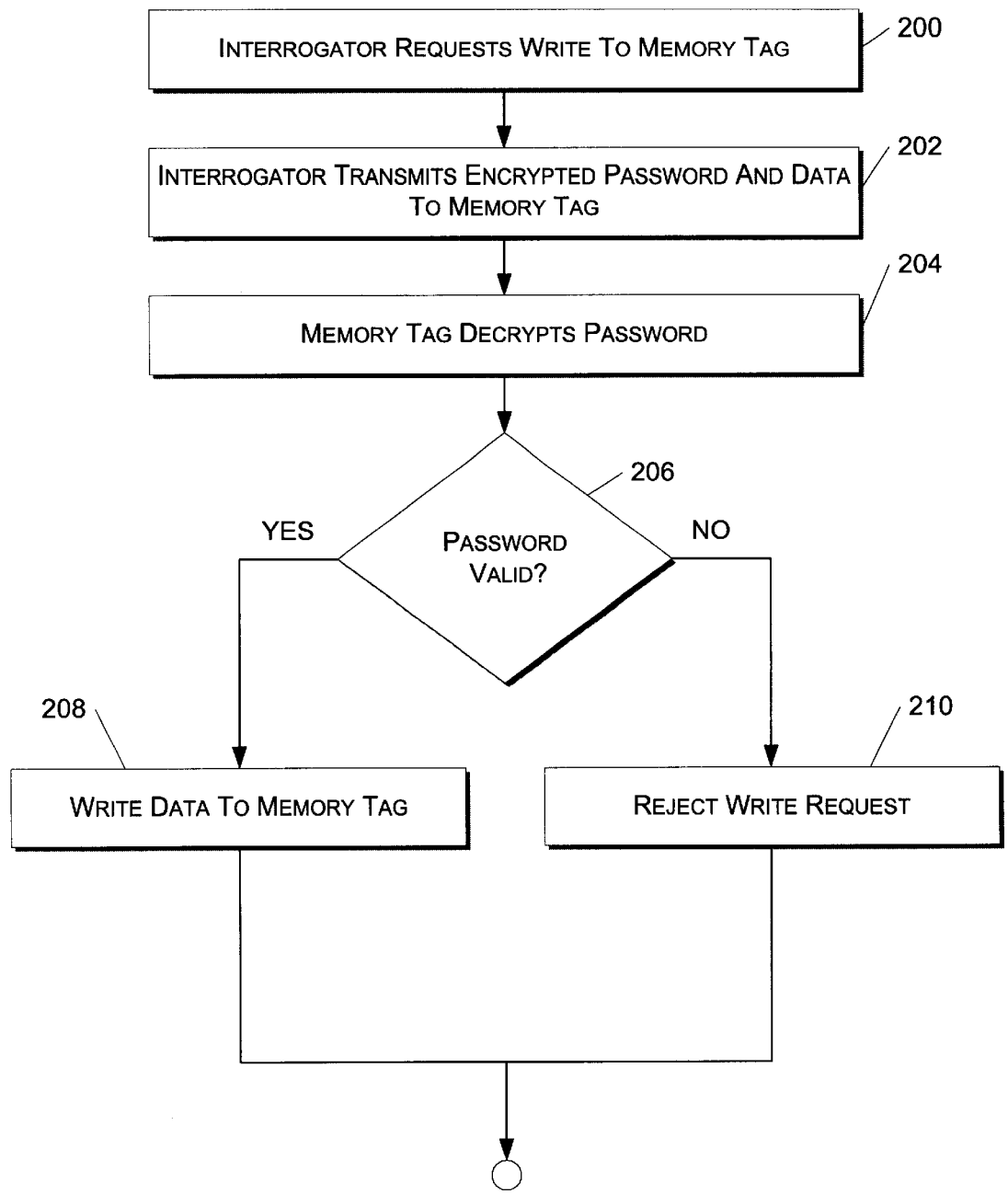
FIG. 5 is a flow diagram of an interrogator to cartridge authentication process.

FIG. 5 depicts a process for authenticating an interrogator to the toner cartridge 32. At Step 200, the interrogator 45 requests to write to the memory tag 36. At Step 202, the interrogator transmits a password to the memory tag 36 together with the data to be written to the memory tag 36. The password is encrypted at the interrogator utilizing a public key distributed to authorized interrogators by the toner cartridge manufacturer.

At Step 204, the microprocessor 42 of the memory tag 36 decrypts the password using a private key stored in the memory tag 36 by the toner cartridge manufacturer. At Step 206, the memory tag 36 determines if the password is valid for a particular data area—either data area 50 or data area 58—of the memory tag 36. (It is assumed for this discussion that data area 48 contains an authentication code 52 that cannot be overwritten).

The data is written to the memory tag 36 at Step 208 if the password is valid. More specifically, if the password is valid for data area 50, the data is written to data area 50. Similarly, if the password is valid for data area 58, the data is written to data area 58. If the password is invalid, the write request is rejected at Step 210.

Thus, a toner cartridge manufacturer may control access to different data areas of the memory tag 36. One password may be provided for data area 50 and one password may be provided for data area 58. Additionally, another password may be provided that allows access to both data area 50 and data area 58. If additional data areas are present, a password may be provided that allows access to some, but not all, of the data areas, while another password may be provided that allows access to all data areas.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A printing system comprising:
   a printing device;
   a replaceable component installable in the printing device; and
   a memory tag affixed to the replaceable component, the memory tag having a plurality of data areas which contain encrypted data; and
   a microprocessor to control access to the data areas by the printing device, wherein the microprocessor is configured to utilize encrypted data received from the printing device to determine which data areas are accessible by the printing device.

2. The printing system recited in claim 1 wherein at least one of the data areas contains an encrypted authentication code and the printing device is configured to read and decrypt the authentication code.

3. The printing system recited in claim 2 wherein the printing device is configured to utilize the authentication code to enable certain printing device functions.

4. The printing device recited in claim 1 wherein the memory tag further comprises electronic logic configured to decrypt encrypted data provided by the printing device.

5. The printing system recited in claim 1 wherein the memory tag is radio frequency identification (RFID) memory.

6. The printing system recited in claim 1 wherein the replaceable component is a toner cartridge.

7. A printing device component, comprising:
   a memory tag having first and second data areas;
   the first data area containing encrypted data; and
   the second data area containing non-encrypted data;
   a microprocessor to control access to the data areas of the memory by an interrogating device, wherein the microprocessor is configured to utilize encrypted data received from the interrogating device to determine which data areas are accessible by the interrogating device.

8. The printing device component recited in claim 7 wherein the first data area contains an encrypted authentication code to identify the printing device component to the interrogating device.

9. The printing device component recited in claim 7 wherein the memory tag is radio frequency identification (RFID) memory.

10. The printing device component recited in claim 7 wherein the memory tag is semiconductor memory.

11. The printing device component recited in claim 7 embodied as a toner cartridge.

12. A method comprising:
   receiving a replaceable component into a printing device, the replaceable component having a memory tag affixed thereto, the memory tag having a plurality of data areas, at least one data area which contains encrypted tag data;
   transmitting encrypted interrogator data from the printing device to the memory tag;
   decrypting the interrogator data at the memory tag;
   utilizing the interrogator data to determine which of the data areas may be accessed by the printing device;
   transmitting the encrypted tag data from the memory tag to the printing device; and
   decrypting the tag data at the printing device.

13. The method recited in claim 12 wherein the memory tag is radio frequency identification (RFID) memory and wherein the encrypted data is transmitted from the memory tag to the printing device without establishing physical contact between the memory tag and the printing device.

14. The method recited in claim 12 wherein the encrypted tag data is an authentication code and wherein the method further comprises utilizing the authentication code within the printing device to determine which printing device functions to enable.

15. The method recited in claim 12 further comprising:
   utilizing the interrogator data to determine if the printing device may read or write to the memory tag.

16. The method recited in claim 12 wherein the memory tag is radio frequency identification (RFID) memory and wherein the encrypted data is sent from the printing device to the memory tag without establishing physical contact between the memory tag and the printing device.

17. A replaceable component for a printing device, comprising:
   a cartridge body;
   a memory tag having first and second data areas, the first data area containing encrypted data and the second data area containing non-encrypted data;
   a microprocessor to control access to the data areas of the memory by an interrogating device, wherein the first and second data areas of the memory tag are configured to be accessible by one or more interrogating devices, and wherein the microprocessor is configured to utilize encrypted data received from the one or more interrogating devices to determine which data areas of the memory tag are accessible by each interrogating device.

18. The replaceable component as recited in claim 17 wherein the first data area of the memory tag contains an encrypted authentication code to identify the printing device component to an interrogating device.

19. The printing device component recited in claim 17 wherein the microprocessor is located in the memory tag.

20. The replaceable component as recited in claim 17 wherein the memory tag is radio frequency identification (RFID) memory.

21. The replaceable component as recited in claim 17, further including a label affixed to the cartridge body, wherein the memory tag is located between the cartridge body and the label.

* * * * *